United States Patent [19]
Hinton et al.

[11] Patent Number: 5,423,014
[45] Date of Patent: Jun. 6, 1995

[54] INSTRUCTION FETCH UNIT WITH EARLY INSTRUCTION FETCH MECHANISM

[75] Inventors: Glenn J. Hinton, Portland; Robert M. Riches, Jr., Hillsboro, both of Oreg.

[73] Assignee: Intel Corporation, Santa Clara, Calif.

[21] Appl. No.: 202,710

[22] Filed: Feb. 24, 1994

Related U.S. Application Data

[63] Continuation of Ser. No. 784,569, Oct. 29, 1991, abandoned.

[51] Int. Cl.⁶ .................. G06F 12/10; G06F 12/00
[52] U.S. Cl. ........................... 395/400; 395/375; 395/475; 395/500; 364/DIG. 1; 364/DIG. 2; 364/243.41; 364/243.45; 364/243.4; 364/256.4; 364/256.5; 364/255.7; 364/961.4; 364/961.2; 364/939.3; 364/955.5; 364/963.3; 364/964.2
[58] Field of Search ............... 395/400, 375, 425, 800

[56] References Cited

U.S. PATENT DOCUMENTS

| | | | |
|---|---|---|---|
| 4,727,484 | 2/1988 | Saito | 395/400 |
| 4,774,653 | 9/1988 | James | 395/400 |
| 4,811,206 | 3/1989 | Johnson | 395/400 |
| 4,811,209 | 3/1989 | Rubinstein | 395/400 |
| 4,888,688 | 12/1989 | Hartvigsen et al. | 395/400 |
| 5,067,078 | 11/1991 | Talgam et al. | 395/400 |
| 5,202,969 | 4/1993 | Sato et al. | 395/425 |
| 5,249,276 | 9/1993 | Honmura et al. | 395/400 |
| 5,261,066 | 11/1993 | Jouppi et al. | 395/425 |
| 5,276,848 | 1/1994 | Gallagher et al. | 395/425 |
| 5,319,760 | 6/1994 | Mason et al. | 395/400 |
| 5,349,651 | 9/1994 | Hetherington et al. | 395/400 |

OTHER PUBLICATIONS

"MC68030 Enhanced 32-Bit Microprocessor User's Manual Second Ed." Section 6 On-chip Cache Memories, 1989.

Primary Examiner—Parshotam S. Lall
Assistant Examiner—Timothy L. Philipp
Attorney, Agent, or Firm—Owen L. Lamb

[57] ABSTRACT

An instruction fetch unit in which an early instruction fetch is initiated to access a main memory simultaneously with checking a cache for the desired instruction. On a slow path to main memory is a large main translation lookaside buffer (TLB) that holds address translations. On a fast path is a smaller translation write buffer (TWB), a mini-TLB, that holds recently used address translations. A guess fetch access in initiated by presenting an address to the main memory in parallel with presenting the address to the cache. The address is compared with the contents of the TWB for a hit and with the contents of the cache for a hit. The guess access is allowed to proceed upon the condition that there is a hit in the TWB (the TWB is able to translate the logical address into a physical address) and a miss in the I-cache (the data are not available in the I-cache and hence the guess access of main memory is necessary to get the data). The guess access is canceled upon the condition that there is either a miss in the TWB (the TWB is unable to translate the logical address into a physical address) or a hit in the I-cache (the data are available in the I-cache and hence the guess access of main memory is not necessary). In this case a fetch access is reissued on the "slow" path that goes through the large main TLB.

5 Claims, 6 Drawing Sheets

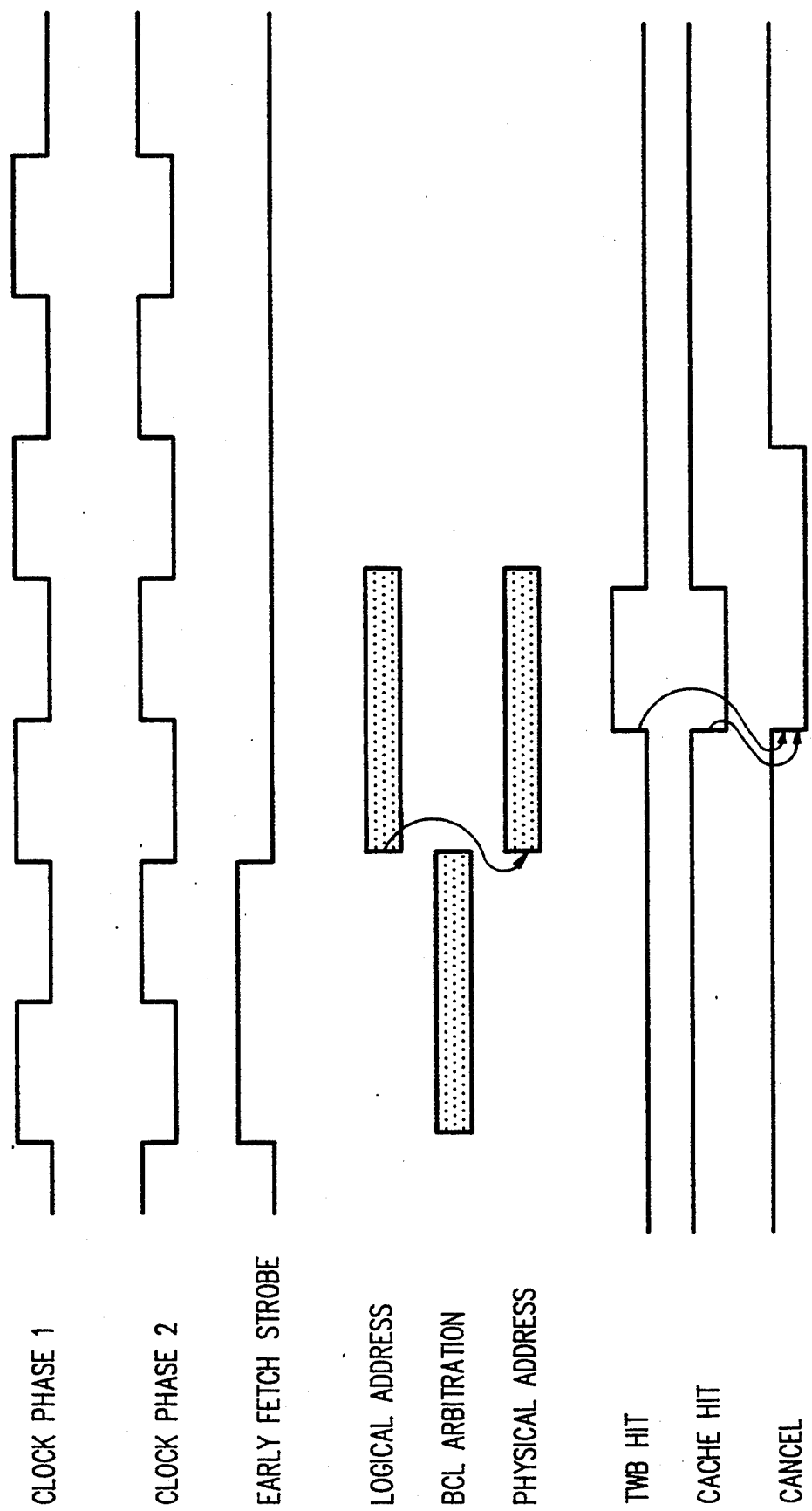

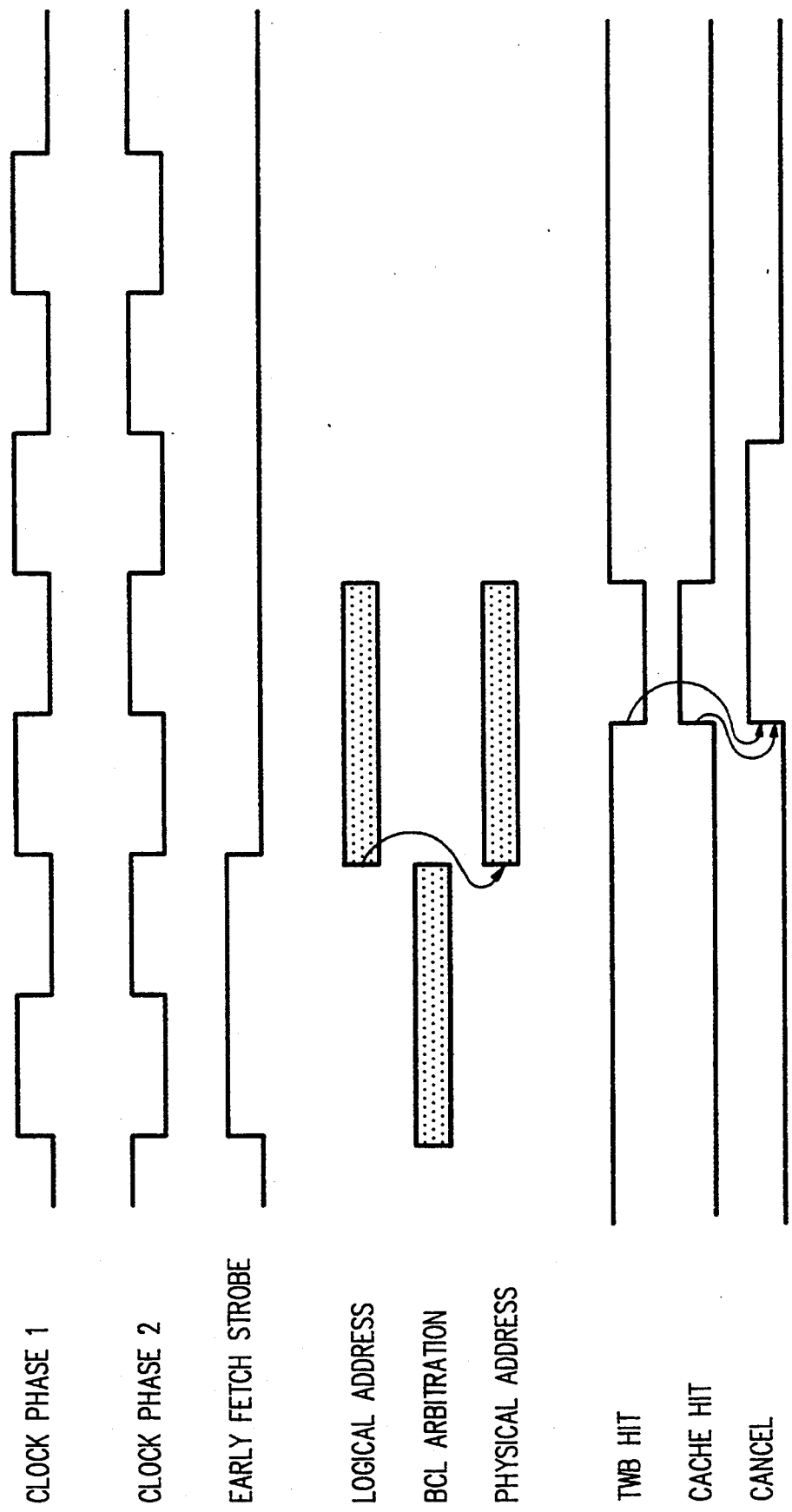

5,423,014

INSTRUCTION FETCH UNIT WITH EARLY INSTRUCTION FETCH MECHANISM

CROSS REFERENCES TO RELATED APPLICATIONS

This application is related to the following patent application "A Pipeline Microprocessor in Which Multiple Functions are Performed During Each Pipeline Stage" Ser. No. 07/630,499, filed 12/20/90, now U.S. Pat. No. 4,001,291, and "Instruction Fetch Unit in a Microprocessor That Executes Multiple Instructions in One Cycle and Switches Program Streams Every Cycle" Ser. No. 06/630,498, filed 12/20/90, now abandoned, both assigned to Intel Corporation. Also, this application is a continuation of U.S. patent application 07/784,569, filed Oct. 29, 1991, now abandoned.

BACKGROUND OF THE INVENTION

1. Field of the Invention

The invention relates to data processing systems and more particularly to a method and apparatus for initiating an early instruction fetch to an external bus controller simultaneously with checking an on-chip cache for the instruction.

2. Description of the Related Art

Many recent processors run at peak rates of one instruction per clock cycle, but they can execute only one instruction stream at any given time. The processor described in application Ser. No. 07/630,499, can execute up to 3 instructions in a clock cycle. It can make use of look-ahead information in the program sequence up to 4 instructions ahead of the current program counter. It can also switch between independent program streams on a cycle-by-cycle basis with 0-clocks overhead. All this makes this processor extremely hungry for instructions at its micro-bus, so an on-chip instruction cache is used to hold frequently used instructions.

Traditionally, processors with an on-chip instruction cache (I-cache) first access the on-chip I-cache before attempting to fetch instructions from the off-chip bus. If the fetch-access requested misses the on-chip instruction cache, then the access is sent to the external bus controller for an off-chip access. This serial process (first check the on-chip cache, then go off-chip) causes extra delay in getting the requested instruction data when the access misses the on-chip cache. This extra delay in getting the instructions slows the processor down when running applications that frequently miss the on-chip I-cache.

It is an object of the present invention to provide an instruction fetch unit that will supply multiple instructions per clock to a micro bus from several sources on dem and in response to an address from a program counter by initiating an instruction fetch to an external bus controller simultaneously with checking an on-chip cache for the instruction.

SUMMARY OF THE INVENTION

Briefly, the above object is accomplished in accordance with the present invention by providing an instruction fetch unit (IFU) which has therein instruction fetch logic and a mini-translation lookaside buffer, a translation write buffer(TWB). An instruction cache (I-cache) stores instructions at physical addresses and fetches instructions from a main memory. Instructions are fetched in response to a logical address in an instruction pointer. The TWB is a translator for mapping these logical addresses to physical addresses of the I-cache. A guess fetch access to main memory is issued by presenting an address from the IFU to a bus controller in parallel with presenting the address to the I-cache. The address is checked with the contents of the TWB for a hit and the address is checked with the contents of the I-cache for a hit. The guess access is allowed to proceed upon the condition that there is a hit in the TWB (the TWB is able to translate the logical address into a physical address) and a miss in the I-cache (the data are not available in the I-cache and hence the guess access of main memory is necessary to get the data). The guess access is canceled upon the condition that there is either a miss in the TWB (the TWB is unable to translate the logical address into a physical address) or a hit in the I-cache (the data are available in the I-cache and hence the guess access of main memory is not necessary).

BRIEF DESCRIPTION OF THE DRAWINGS

The foregoing and other objects, features, and advantages of the invention will be apparent from the following more particular description of a preferred embodiment of the invention as illustrated in the accompanying drawings, wherein:

FIG. 3 is a timing diagram of a successful early fetch;

FIG. 4 is a timing diagram of an unsuccessful early fetch; and,

DESCRIPTION OF THE PREFERRED EMBODIMENT

Figure 1:
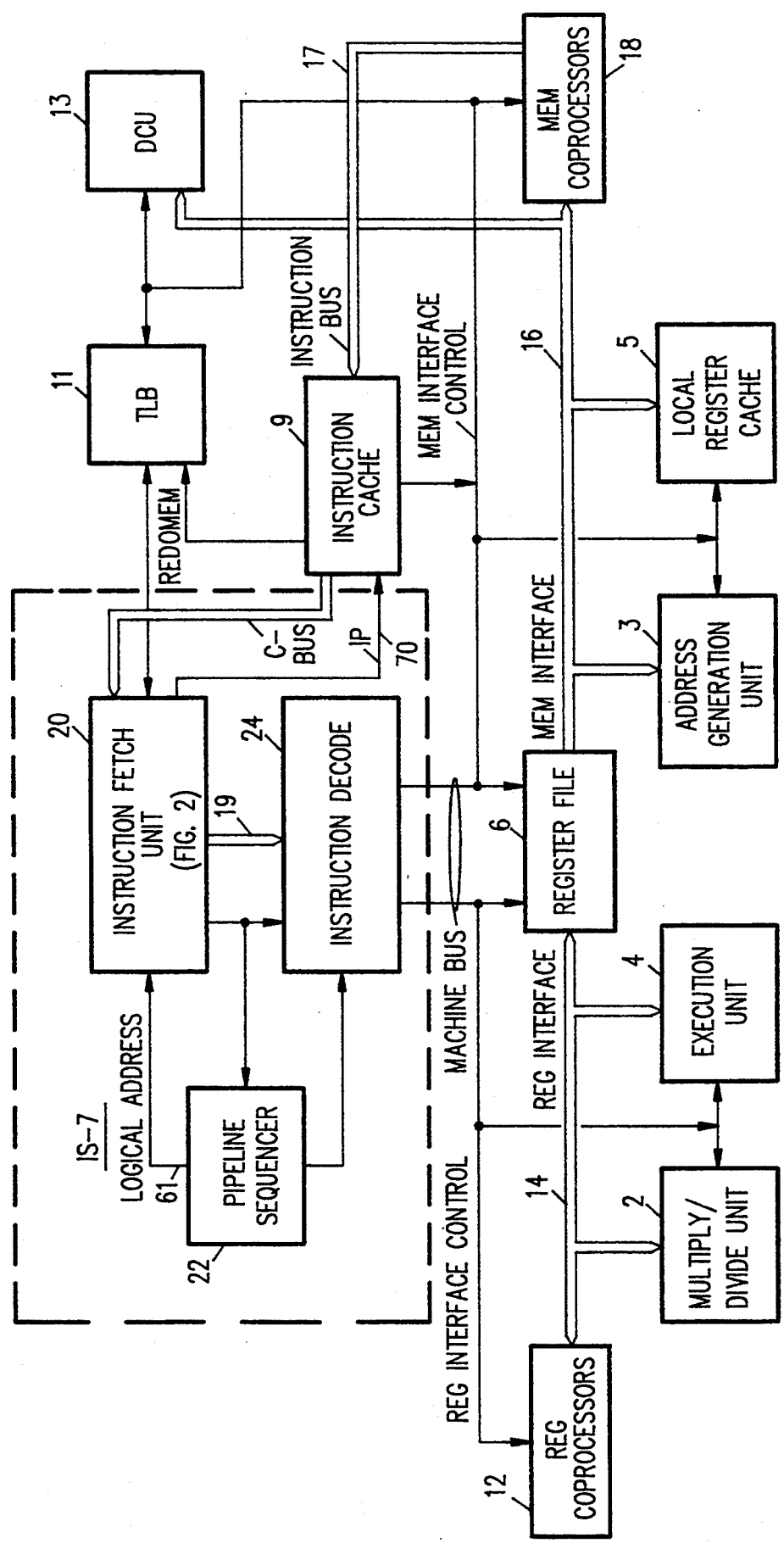
FIG. 1 is a block diagram of a microprocessor in which the present invention is embodied.

Referring to FIG. 1, the microprocessor in which the present invention is embodied is briefly described below. For more detailed information refer to the above-identified copending application Ser. No. 07/630,499.

Instruction Cache and ROM (I-Cache)

This unit (9) provides the Instruction sequencer (7) with instructions every cycle. It contains a 2-way set-associative instruction cache and a microcode ROM. The ROM is an always-hit portion of the cache. The I-Cache is four words wide and is capable of supplying four words per clock to the Instruction Sequencer (IS). The I-Cache also contains the external fetch handling logic that is used when an instruction fetch misses the I-Cache.

Instruction Sequencer (IS)

The IS (7) decodes the instruction stream (19) and drives the decoded instructions onto the machine bus which is the major control bus. It includes the Fetch Unit (IFU-20), the Instruction Decoder (ID-24) and the Pipeline Sequencer (PS-22). The instruction sequencer (7) decodes the incoming four instruction words from the Cache (9). The instruction sequencer detects dependencies between the instructions and issues as many instructions as it can per clock.

Register File (RF)

The RF (6) has 16 local and 16 global registers. The RF has 4 independent read ports and 2 independent write ports to support the machine parallelism.

Execution Unit (EU)

The EU (4) performs all the simple integer and ordinal operations of the microprocessor in which the present invention is embodied.

Multiply-Divide Unit (MDU)

The MDU (2) performs the integer/ordinal multiply, divide, remainder, and modulo operations.

Address Generation and Execution Unit (AGEU)

The AEGU (3) is used to do the effective address calculations in parallel with the integer execution unit. It performs the load-effective-address instructions (LDA) and also does the address computations for loads and stores.

Local Register Cache (LRC)

The LRC (5) maintains a stack of multiple 16-word local register sets. On each call the 16 local registers are transferred from the RF to the LRC. This allocates the 16 local registers in the RF for the called procedure. On a return the 16 words are transferred back into the RF to the calling procedure.

Translation Lookaside Buffer or TLB

The Translation Lookaside Buffer (TLB-11) is used by the instruction fetch unit for mapping logical addresses to physical addresses Data Cache Unit or DCU The Data Cache Unit (DCU-13) is a 2K byte physical write-through data cache with a line size of 16 bytes. It is connected to the RF by a 128 bit-wide bus so up to 16 bytes can be transferred in a single clock cycle.

REG and MEM Interfaces

The REG interface (14) is where all of the REG format instructions are executed. One instruction per clock can be issued on the REG interface. The operations can be single or multi-cycle as long as they are independently sequenced by the respective REG coprocessor (12). The coprocessors on this interface arbitrate among themselves if necessary to return their results.

The MEM interface (16) is where all MEM format instructions are executed. It also connects the system to the memory coprocessor (18). The on-chip memory coprocessor can be a bus controller (BCU) that connects to off-chip memory. One instruction per clock can be issued on this interface. The operations can be single or multi-cycle just as described above for the REG interface. The coprocessors on this interface arbitrate among themselves if needed to return their results.

The Instruction Fetch Unit

The main function of the Instruction Fetch Unit or IFU (20) is to provide instructions to the Instruction Sequencer (IS) unit. It's auxiliary functions include fetching instructions from external memory, managing the contents of the instruction cache (9), translating the logical addresses supplied by the Pipe Sequencer (PS) into physical addresses, and providing some preliminary instruction decoding and control functions to help the IS.

In order to carry out its functions, the IFU contains a ROM (50) which contains the internal microcode used on the chip, an instruction cache (56) to hold instructions fetched from memory, instruction queues (52) for temporary instruction storage between memory and the cache, instruction pre-decode (54) and post-decode logic (58), address translation logic (62), cache tag logic (60), and the necessary control logic (70) to make everything work together.

Each cycle, the PS gives the IFU some control information and the logical address of some instructions it wants the IFU to supply. If the instructions are in the ROM, the IFU supplies the instructions one phase later. If the instructions are to come from memory, the IFU translates the logical address into a physical address, then checks to see whether the instructions are already in the cache. If the instructions are in the cache, the IFU supplies them to the ID one phase after the address was presented by the PS. If the address translation fails or the instructions are not in the cache, the IFU fetches them from memory. As the instructions are being fetched from memory, the address translation buffer (62) is updated, and the cache tag array (60) is written. When the instructions (82) arrive from the Bus Control Logic (BCL-72), they are put in the instruction queues (52), along with their pre-decode information. If the PS still wants these particular instructions, the IFU supplies them to the ID, along with the appropriate post-decode and control information.

Figure 2:
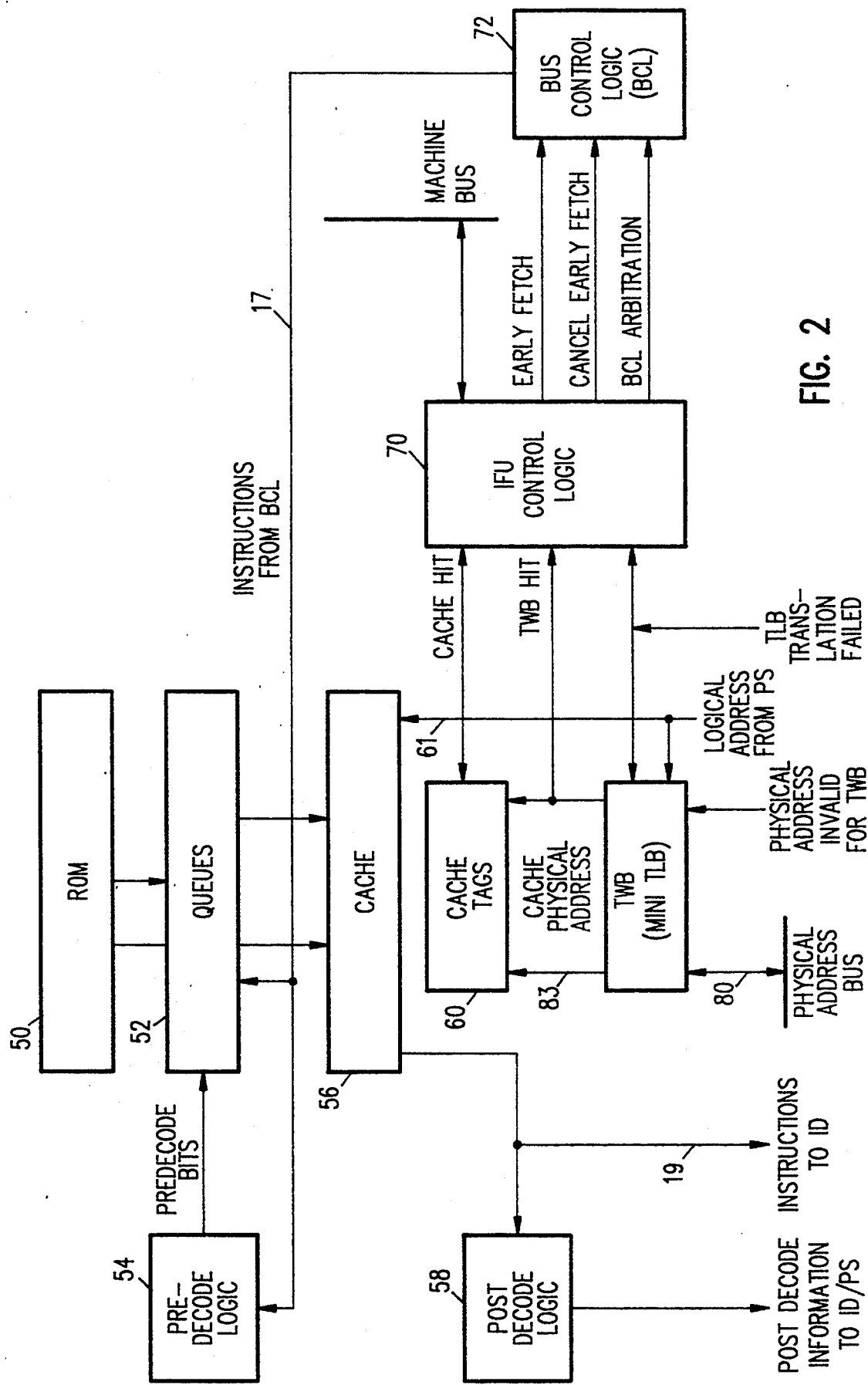
FIG. 2 is a block diagram of the instruction fetch unit shown in FIG. 1.

Refer to FIG. 2. The functional blocks that make up the IFU are as follows:

Cache: The cache (50) contains instructions fetched from external memory.

Cache Tags: The tags block (56) holds the tags for each line of the cache. These tags are physical addresses rather than logical addresses. The physical address (80) from the translation write buffer (TWB) (62) is used by the tags block both for comparison of existing tags and for writing new tags into a tag random access memory (tags RAM).

Queue: The queues block (52) receives fetched instructions from the bus control logic (BCL) interface bus (82), generates the pre-decode bits, and holds these predecoded instructions until the cache is ready to receive them.

Post-decode: The post-decode block (58) contains logic that decodes the instructions from the cache and read only memory ROM (50) to generate some control signals needed by an instruction decoder (ID) and a pipe sequencer (PS) described in the above-identified application Ser. No. 07/630,499, now U.S. Pat. No. 4,001,291.

ROM: The ROM (50) contains the internal microcode that are supplied to an execution unit that is not shown in FIG. 1.

Translation write buffer (TWB: The TWB or mini-TLB (62) is a 2-entry direct mapped Translation Lookaside Buffer (TLB) for use by the IFU. It is used for mapping logical addresses (81) to physical addresses (80) for purposes of comparing and writing the tags.

Control: The IFU control logic (70) contains the control logic for the IFU and includes a control register.

There are two portions of the data path of the IFU, the address path and the instruction path. The address path consists of the logical addresses (81) feeding the TWB, and the physical addresses (83) from the TWB feeding the Tags block. The instruction path consists of the ROM (50), the Queues (52), the Cache (56), and Post-decode (58). The center of the instruction data path is the Cache bit lines. The ROM bit lines are organized as "true" and "bar" bit lines, much like the bit lines in a RAM array. At the bottom of the ROM is an interface cell which drives the values from the ROM bit lines directly onto the Cache bit lines. The Queues also drive the Cache bit lines.

When the execution unit wants instructions from the ROM, the cache row selects are disabled and the ROM bit lines drive onto the Cache bit lines through the interface cell described above. When it wants instructions that have been fetched from external memory into the queues, the Queues drive the Cache bit lines to get the instructions to the sense amps and out of the IFU, and the appropriate Cache row select is asserted to write these instructions from the Queues into the Cache. When the chip wants instructions from the Cache, the Cache drives onto the bit lines.

The Cache bit lines drive the sense amps, which drive MUXes to get the right instructions on the right output lines. The output (57) of the MUXes is sent to the IS units and to the Post-decode block (58). The Post-decode block uses the instruction words to generate some control signals for the IFU control logic, the ID (Instruction Decoder), BLA (Branch Look-Ahead) unit, and the PS (Pipe Sequencer).

IFU Control Register

The IFU control register (70) is writable by doing an "Ida (SREG)[ld_extumap, s31" micro-instruction where SREG is replaced by the register where the desired bit pattern resides. The IFU control register is not readable.

There are six active fields in the register:

Bits 0 to 3: These bits are the regional caching control nibble. Each of these bits represents a region, defined as one of the four 1 GB chunks of the linear address space. Whenever a fetch is issued, the upper two bits of the logical address select one of these four register bits. This bit is sent to the BCL, which interprets a 1 as meaning it should use the instruction cache portion of the BBL address space and a 0 as meaning it should use the data cache portion.

Bits 4 to 7: These bits control the early fetch mode and affect the aggressiveness of the early fetch logic. The encodings shown in TABLE I are allowed.

| Encoding | Mode | Meaning |
| --- | --- | --- |
| '1000 | A | Never do an early fetch while in macrocode mode. When in microcode mode never, preempt a memory access. |
| '0000 | B | Earyl fetch never preempts a memory access. |
| '0001 | C | Early fetch preempts a memory access if it has been scoreboarded twice. |
| '0011 | D | Early fetch preempts a memory access if it has been scoreboarded once. |
| '0100 | E | Early fetch always preempts memory accesses. |

Bit 8: This is the late cancel disable bit. If it is a 1, this bit prevents the IFU from using instructions if there is a possibility of them being invalidated by the late cancel mechanism.

Bit 14: This bit causes the fetching logic to ignore the presence of a valid branch instruction ahead in the instruction stream. This feature disables both machine bus fetches and early fetches if there is a valid branch instruction ahead. In the default mode, with this bit zero, a branch instruction disables fetches. If this bit is set to one, branches are ignored and fetches remain enabled—nullifying this feature. Having this bit in the default zero state will increase performance and reduce bus hogging for most applications. However, there may be some applications which run faster with this bit set to one.

Bit 15: This bit enables a special testing mode to allow reading the ROM. This bit should be left in the default zero state for normal operation. Microcode that reads the contents of the microcode ROM should set this bit to a 1, execute the loop that reads out ROM contents, then restore this bit to a zero state.

Bits 16 to 31: These bits are the external microcode base mapping register. When the machine is in external microcode mode they are ORed with bits 0 to 21 (right justified) of the logical address to generate the physical address for the Tags block and for the PhysAddrq21 bus.

Bits 9 to 13: Empty.

Machine Bus Fetch

One of the mechanisms the IFU can use to fetch instructions is the machine bus fetch. With this mechanism, once the IFU knows for certain that it needs an instruction block, it drives the machine bus with an opcode that signifies an instruction fetch. The AGEU (2) sends the logical address to the TLB (11), which translates it to a physical address and passes the access to the BCL (18). The BCL gets the instructions from the bus and returns them to the IFU, which puts them in the cache and sends them to the IS.

If the TLB (11) was able to translate the logical address to a physical address, and it is a translation the TWB can handle—meaning bits 0 to 11 of the logical and physical addresses are identical—the TWB stores away the logical and physical address in one of its entries. This is the mechanism by which the TWB is loaded.

One feature of the machine bus fetch is that it only prefetches what it can see from the cache. Due to the addressing scheme employed in the cache, the cache can only see into the next block when the "current" address, on Uaddrq01, is in the last half of the current block. Thus, the farthest the machine bus fetch mechanism can fetch ahead is six instruction words—the last two words of the current block plus all four words of the next block.

Early Fetch

The early fetch mechanism relies on the TWB (62) to do its address translation, and it has two cycles less latency than the machine bus mechanism described US patent application Ser. No. 07/630,499. Early fetch must be requested before the IFU has even seen the address which will end up being fetched, so early fetch is issued much more often than actually needed. When the fetch is not needed, the IFU cancels it. Normally, the IFU requests early fetches whenever the rest of the IFU could handle an early fetch being issued and when there is a chance that one might be needed.

When the IFU wishes to do an early fetch, it asserts Early Fetch (EarlyFetq11) to tell the BCL to expect an early fetch. If any of the signals RedoMemq21, TlbIssueq11, or BusQFullq21 is asserted, the early fetch is considered to be preempted. One cycle after asserting EarlyFetq11, the IFU drives Uaddrq01 onto PhysAddrq21 in the same phase. (This is where the two-cycle reduced latency is accounted for in terms of pipe stages.) In pipe stage 02, the TWB (62) compares the logical address with its contents and the cache (56) checks to see if the instructions are already in the cache. If the address missed the TWB, or if the instructions are already in the cache, the IFU asserts Cancel Early Fetch (IfuCanclq22) to cancel the early fetch.

Since early fetch and memory accesses driven on the machine bus would both use the BCL queues (52), the logic must guarantee that they don't happen simultaneously. When in non-aggressive early fetch modes, the IFU detects that a memory access is on the machine bus and deasserts the early fetch request. With more aggressive early fetch modes, the IFU can issue an early fetch at the same time a memory access is on the machine bus.

If the IFU does this, it is responsible to pull MemScbOKu12 to ensure that the memory access on the machine bus is not taken. The BCL (72) gives higher priority to an early fetch request than to a machine bus memory access, so this works out.

This prioritization gives the IFU exclusive control over whether the BCL sees a machine bus memory access or an early instruction fetch, and this is key to allowing control of the early fetch aggressiveness by the early fetch mode bits in the IFU control register. In the default and less aggressive fetch modes, the IFU deasserts EarlyFetq11 and allows the machine bus memory access to proceed. In the more aggressive early fetch modes, the IFU requests an early fetch and cancels the machine bus memory access by discharging ScbOKq12.

Slow and Early Paths

The instruction-fetch logic has two paths to the bus controller. The first path is the "slow" path. This path is more like the traditional path on processors. This path is only used if the "early path" is disabled (by a mode bit), or if the instruction mini-TLB (TWB), inside the instruction fetch unit, has a miss. This slow path looks like a normal load access except that the data is returned to the instruction cache (56) rather than the processor register file (6). This "slow" access goes through the large on-chip TLB (11) like all loads and stores which slows the external fetch even one more clock than would otherwise be needed. This is needed sometimes to refill the small TWB when it has a miss. This is why this "slow" path to the external bus controller is used when the TWB has a miss.

The "early fetch" path goes directly to the bus controller (72). This early-fetch mechanism is used to issue a "guess" access to the external bus controller in parallel with an identical access given to the on-chip I-cache (56). This guess access is either allowed or canceled after checking the on-chip I-cache for a hit and checking the TWB for a hit. If the on-chip cache has the data, then the external guess access is canceled. If it does not have the data, then the external access is allowed to complete. If the TWB is not able to translate the logical address into the correct physical address, this early-fetch path is also not used and the external access is canceled. The fetch access is then reissued on the "slow" path that goes through the main large TLB.

The external bus controller (72) can only accept one access each clock. This access could be an instruction fetch, or a load, or store access. The IFU must do the arbitration to use this single "port" into the external bus controller. If the path to the bus controller is not busy (no loads, stores, previous I-fetches), then the IFU sends the fetch IP to the bus controller at the same time it sends it to the on-chip I-cache.

FIG. 3 is a timing diagram of a successful early-fetch transaction. The early-fetch strobe is generated by the IFU, in anticipation of a logical address. The BCL arbitration takes place at the same time as the early-fetch strobe is asserted. If this arbitration fails, the early fetch effectively did not happen. The logical address is given to the IFU one cycle later. The TWB generates a physical address the same phase as it receives the logical address. The following phase, the cache and the TWB are accessed. If the TWB hits, meaning the physical address generated by the TWB is valid, and the cache misses, meaning the referenced instructions are needed from external memory, the early fetch is allowed to complete.

FIG. 4 is a timing diagram of an unsuccessful early fetch. The early-fetch strobe is generated by the IFU, in anticipation of a logical address. The BCL arbitration takes place at the same time as the early-fetch strobe is asserted. If this arbitration fails, the early-fetch effectively did not happen. The logical address is given to the IFU one cycle later. The TWB generates a physical address the same phase as it receives the logical address. The following phase, the cache and the TWB are accessed. If either the cache hits, meaning the instructions are already in the cache, or the TWB misses, meaning that the physical address generated by the TWB is invalid, the cancel signal is asserted and the early fetch is canceled.

Queue Selection

The early fetch mechanism, alters some of the timing relationships involved in issuing a fetch and reserving a queue entry.

Queue Tag And State (Including Cache Tag Valid)

Each queue entry (52) is associated with a six-bit tag and some control bits in the Fetch block (70). The control bits' names are FetInQ*, IgnorQ*, LineQ*, Q*CtVal, and CModeQ*. When the InitQ* signals are asserted, the queue entry is being loaded due to a fetch going out, and the tag and the control bits are loaded.

The six-bit tag stores address bits 4 through 9 of the block which is being fetched into this queue entry. The queue tag identifies which cache line the fetch will be going to. This width is not sufficient to fully identify the address of the fetch, which requires logic explained subsequently.

FetInQ* is asserted when there is a fetch to this queue entry outstanding. It is set when the queue entry is initialized and cleared when the data comes back from the BCL.

The IgnorQ* bits indicate that the data from this queue entry should be ignored. It is cleared when the queue entry is initialized and set whenever some condition happens which causes the queue entry to be untrustworthy. These conditions include cache flush, a cache tag replacement which coincides with the queue entry, a fetch cancellation caused by TlbNakq22, a change in address bits 10 through 31 while the queue's associated cache tag is not valid, a cache miss while the main cache is disabled, and the appearance that both queue entries might both be pointing toward the same block if one of the cache tags is not valid.

The LineQ* bits indicate which side, A or B, of the cache the queue entry is headed toward. Side A corresponds to a '0, and side B corresponds to a '1. This bit is set to the appropriate value when the queue is initialized. If the cache tag is not valid because the TWB missed, and the cache tag later matches or is written, this bit is updated appropriately.

The Q*CtVal bits indicate whether the cache tag associated with the queue entry are valid. When the TWB misses, the IFU must do a fetch to get the TLB to do a translation to update the TWB. When this happens, the IFU must issue a fetch before it can do a proper cache tag lookup. Under these conditions, a queue entry must be initialized to receive the fetch, but the full-width cache tag is not available, and the LineQ* bit cannot be set reliably. This state is signaled by a 0 in the Q*CtVal bit. If or when the cache tag becomes valid, this bit is set, and the LineQ* bit is updated to point to the correct cache size.

Because the six-bit queue tag only stores address bits 4 to 9, which is not a complete address, during the time that the Q*CtVal bit is zero, watch must be kept to ensure that the address doesn't change in a way that could create an ambiguity as to what upper address bits (bits 10 through 31) are associated with this fetch request. While the Q*CtVal bit is low, if bits 10 through 31 change between the time the queue is initialized and the time the cache tags finally become valid, the IgnorQ* bit is set, causing the queue entry to be ignored. If the address stays within the same 1 KB block while waiting for the cache tag to be updated, the queue entry can still be trusted, so it remains live. This mechanism retains as much performance as possible without compromising safety and correctness of the cache.

The CModeQ* bits indicate which mode (enabled or disabled) the cache was in when the fetch was issued. If the cache enable mode changes, this bit indicates that the queue entry should not be trusted in order to prevent corrupting the main cache or the baby cache with data actually intended for the other.

Event OK

The event OK mechanism (only used for machine bus fetches) is required in order to correctly handle TLB misses and qualification assists on instruction fetches. The logic only signals a page miss if an instruction is needed from the page in question. Since the TLB should have a good hit rate, the logic will also hold off qualification assists until the instruction is actually needed. There are two parts to this mechanism.

The first part is the TLB must tell the IFU if a fetch cannot be processed due to a translation failure. This requires a signal from the TLB (11) to the IFU (20). It is called TlbNakq22. If the IFU sees TlbNakq22 in the proper time frame, it undoes any state affected by the fetch in progress, effectively forgetting that the fetch ever went out.

The second part is that the IFU must figure out whether it actually needs the instructions in question. If the IFU actually needs the instructions being fetched, it asserts EventOKq11 at the same time the fetch is on the machine bus. If the TLB sees this signal asserted during a fetch, it still asserts TlbNakq22 if the translation fails, and it issues the assist or fault. TlbNakq22 causes the IFU to forget about the original fetch issue, and when microcode has qualified the TLB page or cleaned up the problem, the fetch is issued again, and the program continues to execute.

Late Cancel

The late cancel mechanism allows instructions to be used assuming a backside cache hit, and cancelled if the backside cache misses. The need for a special mechanism is because the signal that differentiates hits from misses is one phase later than the bus that contains the instructions. Unless the late cancel disable bit is on in the IFU control register, the IFU will use instructions from the BBL if they might be valid. If they turn out to be invalid, the BBL asserts LateCanclq22 one phase after it drove the instructions on BDataq41 (another two-cycle mismatch in pipe stage numbering). If the IFU drove these invalid instructions into the cache and out to the IS, it causes a restart by asserting CanIdBufq11. This causes the PS to do a restart and forget that it saw the invalid instructions. The IFU also clears the MacTag bits of the appropriate set.

This does have the undesired effect of sometimes clearing the MacTag bits of the block immediately before the block that had the late cancel. However, this block will now be in the backside cache (assuming it's enabled), so the latency won't be too bad when the processor returns to that block.

Regional Caching

The backside bus address space is separated into private memory, instruction cache and data cache. The regional caching allows each linear region (each 1 GB chunk of the linear address space) to select which of the cache portions it will use. This eliminates some performance problems that would have been caused by cache coherency requirements if the logic did not have this mechanism. It also allows self-modifying code when using the data cache.

Most of the mechanism is implemented in the TWB. The lower four bits of the IFU control register select the caching state for the four linear regions. When in macrocode mode, the two upper address bits control a MUX which selects the appropriate bit to drive onto the ICacheq01 ICacheq01 signal. When in microcode mode, ICacheq01 is always driven to 1, regardless of the control register bits, because external microcode is guaranteed to not be self-modifying, so it doesn't need the bus snooping functions of the data cache. Signal ICacheq01 is delayed by the appropriate number of phases and sent out on ICacheq11 ICacheq11 to the BCL. An exception occurs if in external microcode mode and oscillating between regions. The value from two cycles ago is used. When doing an early fetch, the ICacheq11 bit is sent out one cycle before the correct microaddress is known, so it is a guess. If the guess is wrong, the early fetch is cancelled, to be retried later, hopefully with a correct guess.

Cache Disable

The IFU incorporates a "cache disable" mode. This mode actually switches usage from the main, large cache to a smaller "baby" cache. The "baby cache" only contains two sets, each of which only has one block. There is a small block of RAM on the top of the cache and tags arrays to implement this function. There is also a separate set of control and decoding logic for this extra cache. Since the normal cache sets contain two blocks per set, and the baby cache only has one block per set, some of the address decoding and handling differs between normal mode and cache disable mode, especially in the handling of address bits 4 and 5.

The Cache block (56) contains the data RAM for a 2 KB instruction cache. It is 2-way set associative, the line size is 32 bytes, and the transfer block is 16 bytes. So, the cache consists of 32 sets, each containing 32 bytes in each for each way. The cache can access between 12 and 16 bytes of data at a time, either one contiguous 16-byte block, the last three words of a 16-byte block, the last half of a 16-byte block and the first half of the next block, or the last word of a block and the first two words of the next block. In addition to this normal cache, there is a "baby cache" which consists of two sets of one 16-byte block each per way.

The Tags block (60) holds the tags for each line of the cache. The tags are physical addresses rather than logical addresses in order to avoid having to flush the entire cache whenever the linear address changes due to a call domain or a context switch. Since the cache consists of 32 sets, and the cache has two ways, there are 128 tag entries. The tags block can access two tags per way each cycle, the current set and the next set. The tag replacement strategy is Least Recently Used (LRU), with tag replacement counting as an access for LRU purposes.

The Queues block (52) receives, assembles, and holds fetched instructions coming in from the BCL in preparation to being written into the cache and sent on to the ID. It also contains the pre-decode PLAs, which generate a few pre-decode bits based on the incoming instruction words. These pre-decode bits are stored in the queue entries and then in the cache. This function is done prior to caching the instructions, because there is not enough time to perform this logic on the instructions read out of the cache on their way to the ID.

The Post-decode block (58) performs some more decoding of the instructions being read out of the cache and ROM. It sends this post-decode information, and some control signals, to the ID, BLA, and PS.

The ROM (50) contains 12 KB of internal microcode used by the chip. It is complementary in nature in order to drive onto the cache bit lines. Like the cache, it is capable of reading out 12 to 16 bytes of data per cycle. Because the ROM is not a power of two in size, and because of pitch matching constraints, the lower 8 KB of the ROM maps onto both sides A and B of the cache, alternating "sides" with increasing addresses, while the upper 4 KB of the ROM only maps onto side A.

The TWB (mini-TLB) contains logic to map logical addresses to physical addresses, for use by the Tags block and for issuing early fetches. The TWB is a 2-entry direct mapped translation lookaside buffer. It contains one entry for use by even-numbered pages and another entry for use by odd-numbered pages. The TWB also contains some address comparators needed to correctly track incoming fetches when the cache tags have not been written, as well as the drivers to put the physical address on the PhysAddrq21 bus when doing an early fetch.

The Fetch Control Logic block (70) contains the control logic needed to make the IFU work. It consists of three blocks, CIFFQUET which contains the shortened tags used to track incoming fetches in the queues, CIFFQCTL which contains logic to control the queues, and CIFFDAPR which contains the rest of the control logic.

Instruction Word MUXing Scheme

The data path is organized into quadword blocks. The two lower-order words are called "even", even and the two higher-order words are called "odd". The PS supplies the IFU with the "current" current address, the address of the first desired instruction, and the "next" next address, an address 16-bytes higher than the "current" address. Depending on the lower address bits, the "even" and "odd" portions of the data path use the "current" or "next" addresses in order to supply a minimum of three instruction words regardless of what address is given. To understand this feature, visualize a portion of the instruction stream to consist of eight instruction words:

Increasing Addresses ⟶

Word: 0 1 2 3 4 5 6 7 8

TABLE I shows how the scheme works:

TABLE I

| current address | next address | even address | odd address | even address | odd address | final words |
|---|---|---|---|---|---|---|
| 0 | 4 | current | current | 0-1 | 2-3 | 0-3 |
| 1 | 5 | current | current | 0-1 | 2-3 | 1-3 |
| 2 | 6 | next | current | 4-5 | 2-3 | 2-5 |
| 3 | 7 | next | current | 4-5 | 2-3 | 3-5 |
| 4 | 8 | current | current | 4-5 | 6-7 | 4-7 |

The "odd" portion of the data path always uses the "current" address. The "even" portion uses either the "current" address or the "next" address, depending on the lower bits of the supplied address. When the address is in the lower half of a quadword "block", it uses the "current" address, and when the address is in the upper half of a "block", it uses the "next" address. This scheme requires twice the number of row lines that would normally be required for the same size and shape of array, one set of row lines for the "even" portion, and one set for the "odd" portion.

Pre-decode Bits

There are four pre-decode bits in the IFU data path, ModFlg, Const, UFlow UFlow and MacTag. The ModFlg bit indicates that this instruction modifies the condition codes. The Const bit indicates that this instruction has a 32-bit displacement word following it. The UFlow bit indicates that this instruction is implemented via a microcode flow. The MacTag bit indicates that this instruction word is valid. For instructions fetched from memory, held by the Queues, and stored in the Cache, all four bits are used. The pre-decode PLAs in the Queues block generate ModFlg, Const, and UFlow. The MacTag bits are set when instructions are put in the queues or cache and cleared when the instructions are no longer considered valid. For instructions in the ROM, the MacTag bit is redundant because ROM words are always valid, and the UFlow bit is not used since the ROM contains only microcode.

Due to the pre-decode bits, the Cache and Queues data path is 36 bits wide, and the ROM data path is 34 bits wide. The pre-decode bits for the ROM are stored in the ROM array alongside the regular data bits.

Cache

The cache (100) consists of the big 2 KB RAM array, the "clear" logic on the left side, several blocks of decoders on the right side, the sense amps and MUXes below the RAM, the buffers below the MUXes, and the control logic for the MUX and buffers on the right side. The RAM array is a block of static RAM. The decoders control the RAM array row selects, and provide pre-decoding for the ROM. The sense amps, MUXes, and buffers, along with their control logic, implement the scheme explained above for providing a minimum of three instruction words each cycle. They also provide a few early outputs for use by other IFU blocks and the IS.

The "clear" clear logic on the left side of the cache maintains the MacTag bit slice of the Cache. Whenever the entire cache is to be flushed, due to power-up reset or a cache flush issued by microcode, all MacTag bits for the entire cache are cleared. When a tag replacement is done, the MacTag bits for all eight words of the appropriate way of that set (two quadword blocks) are cleared. Also, when the Queues drive instructions through the cache, writing these instructions into the cache, and the BBL signals a Late Cancel, Late Cancel meaning that these instructions are invalid, the MacTag bits for that set are cleared to effectively remove the bad data from the cache.

Cache Tags Block

The tags block (102) contains the physical address for each valid set in the cache. It is the tags block that gives the cache its primary organizational characteristics:

Cache Size: 2 KB
Associativity: 2-way set associative
Set Size: 32-bytes, or 8 words
Transfer Block Size: 16-bytes, or 4 words
Replacement Algorithm: Least Recently Used (LRU)

The tags block consists of a RAM array, two stages of address decode on the right side of the RAM, a sense amp and MUX block below the RAM, a small block of timing and precharge circuits on the left side, and a large block of control logic on the right side of the sense amps and MUXes. The RAM array is a fairly straightforward block of static RAM. The decoders provide the row selects for the RAM. The sense amps and MUXes handles the writing of the RAM and the comparison of the RAM tags to the supplied addresses. The control block on the right side of the MUX block controls the actions of the tag sub-unit.

The tags block data path consists of bits 3 through 32. Bit 3 is the LRU bit, and it only has one bit per row, whereas the rest of the bit slices have an "A" side and a "B" side. Bits 5 through 31 are the main address tags. Bit 32 is the tag valid bit needed to record the fact that the TWB missed for a given logical-to-physical address translation. There are more bits in the tag than would normally be required, because the extra bits must be present when using the baby cache.

In the tags block, the term "next" next usually refers to the next SET (32 bytes), not to the next BLOCK (16 bytes). In most of the rest of the IFU, the term "next" refers to the next BLOCK, so be careful when interpreting signal names.

The match logic in the right-side control block also contains some circuitry to help ROM accesses by faking hits and misses from side A and B of the cache when accessing the ROM. This allows the ROM to use the A-side and B-side bit lines for different parts of the ROM address space.

The logic updates the LRU bit on replaces as well as on matches to avoid a deadlock perpetual restart case when switching between external microcode and macrocode.

Queues Block

The queues block (52) consists of the queue cells in the data path between the ROM and the Cache, two pre-decode PLAs on the left side, and a control block on the right side. The queue cells receive fetched instructions from the BDataq41 BDataq41 bus from the BCL, hold them, and drive them onto the cache bit lines. The pre-decode PLAs decode the incoming instructions to provide the ModFlg, Const, and. UFlow pre-decode bits. The control block decodes and drives the control signals that enable loading the queue cells and driving the bit lines.

Post-decode Logic

The Post-decode logic (58) consists of two PLAs and a large mass of random logic. Its function is to decode the instruction words provided by the ROM and Cache to provide various control signals primarily for the IS. The smaller of the PLAs generates the "select" signals which control gating of the various instruction words to the two sides of the machine bus. The larger of the PLAs generates the "add-count" signals used by the PS to increment the address. The random logic generates branch and microflow lookahead signals for the BLA, the alias control signals for the ID, and a few other control signals for use in the post-decode block and the Fetch block of the IFU.

ROM

The microcode ROM (50) consists of nine sub-blocks of CIFU, the CIFROM[0–7] and CIFRUROM. The CIFROM[0–7] cells are the ROM programming banks, each of which represents a horizontal slice of the data path. Each bank contains 1.5 KB, and the whole ROM contains 12 KB of microcode space. The CIFRUROM cell consists of a precharge block on the top of the data path, an interface cell between the ROM banks and the Queues sub-unit, and a row select driver block that sits above the precharge block.

Because the ROM must use the Cache's bit lines and sense amps, the ROM must be differential, with either the "true" or "bar" bit line pulled low for each bit when the ROM is accessed. Also, the bit lines don't connect directly to the programming devices, but instead connect to a one-per-bank pass device. The Y-select lines, ROMRYSELEx0(0–7) and ROMRYSELOx0(0–7), control the pass devices for the "even" and "odd" portions, one line of each flavor per bank. The X-select lines are common to all the banks (with one exception), and these control the 32 pull-down devices (some on the true bit line, some on the bar bit line) per bank. The X-select lines for bank 0 are called ROMBRXSEL(-0–31), and the X-select lines for banks 1–7 are called ROMARXSEL(0–31).

The bit lines are named according to the following scheme:

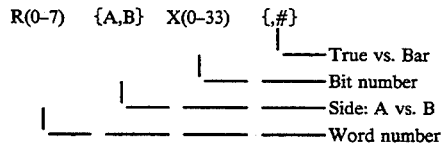

Looking at it from a different perspective, for addresses below 8 KB, the microaddress bits have the following meaning:

| Uaddr Bits | Meaning |
|---|---|
| 3:2 | Word number (0 to 3) |
| 6:4 | Bank number (0 to 7) |
| 7 | Side: 0 = A, 1 = B |
| 12:8 | Row number (0 to 31) |

For addresses above 8 KB, the microaddress bits have the following meaning:

| Uaddr Bits | Meaning |
|---|---|
| 3:2 | Word number (4 to 7) |
| 6:4 | Bank number (0–7) |
|  | Side = A |
| 11:7 | Row number (0 to 31) |

The notion of even vs. odd is contained in the word number. Words 0–1 and 4–5 are considered "even", while words 2–3 and 6–7 are considered "odd".

Since the transistors are pull-down transistors, putting a transistor on the "true" bit line programs a 0, and putting a transistor on the "bar" ('#') bit line programs a 1.

TWB

The TWB (62) is a two-entry direct mapped address translation cache, and it is used to translate the logical addresses supplied by the PS into physical addresses to write the Tags array, to match against the Tags array, and to drive onto the physical address bus when issuing an early fetch. The TWB consists of a block of logic that stores and compares logical addresses, a block that stores physical addresses, a block that MUXes physical addresses for output, and a small block that generates the regional caching signal.

When in macrocode mode, the incoming logical address is separated into three parts. Bits 0 through 11 are the offset within the instruction page, and are passed through to the physical address unmodified. Bit 12 selects which of the two entries in the TWB are to be used for this address. Bits 13 through 31 are compared against the stored logical address in the TWB. If these bits mismatch, it is considered a TWB miss, and the physical address from the TWB is considered invalid. If the bits match, it is considered a TWB hit, and stored physical address bits 12 through 31 are driven out to the Tags block and/or the PhysAddrq21 bus.

When the TLB is given an explicit command to invalidate an entry, the TWB must follow. The TWB does this by decoding linear region qualification and TLB invalidate TLB invalidate commands from the machine bus and marking both TWB entries as invalid. When the TLB implicitly throws out an entry in order to take in another entry, the TWB does not have to be cleared, because the translation in the TWB is still valid, the TLB simply doesn't remember it any more.

When in microcode mode, if logical address bit 22 is not asserted, the address is considered "internal", and the ROM is accessed. If address bit 22 is asserted, the address is considered "external", and the TWB and Cache are accessed. When executing external microcode, logical address bits 0 through 21, right justified, are combined with a 16-bit left justified quantity stored in the IFU control register. Since bits 16 through 21 of these quantities overlap, they are logically ORed together.

With this arrangement, microcode (or the user or OS) has control over the size and alignment of the external microcode space. It can define a 64 KB external microcode space which need only be aligned on a 64 KB boundary, by using bits 16 through 21 for the base address from the IFU control register. Or, it can define an 4 MB external microcode space which must be aligned on an 4 MB boundary, by using bits 16 through 21 as addressing bits. Any size (and alignment) which is a power or 2 between 64 KB and 4 MB is supported, simply by allocating bits 16 through 21, through usage, to either base address in the IFU control register, or to addressing bits.

The circuit path from microaddress bit 12, through the MUX control logic, through the MUX cells, and onto the physical address bus is an extremely critical speed path.

Fetch Control Logic

The Fetch Control Logic (70) contains most of the random control logic in the IFU. It consists of three blocks: CIFFQUET, storage and comparison of the tags for the queues; CIFFQCTL, control of loading and driving of the queues; and CIFFDAPR, the random logic which controls most functions of the IFU.

Figure 5A:
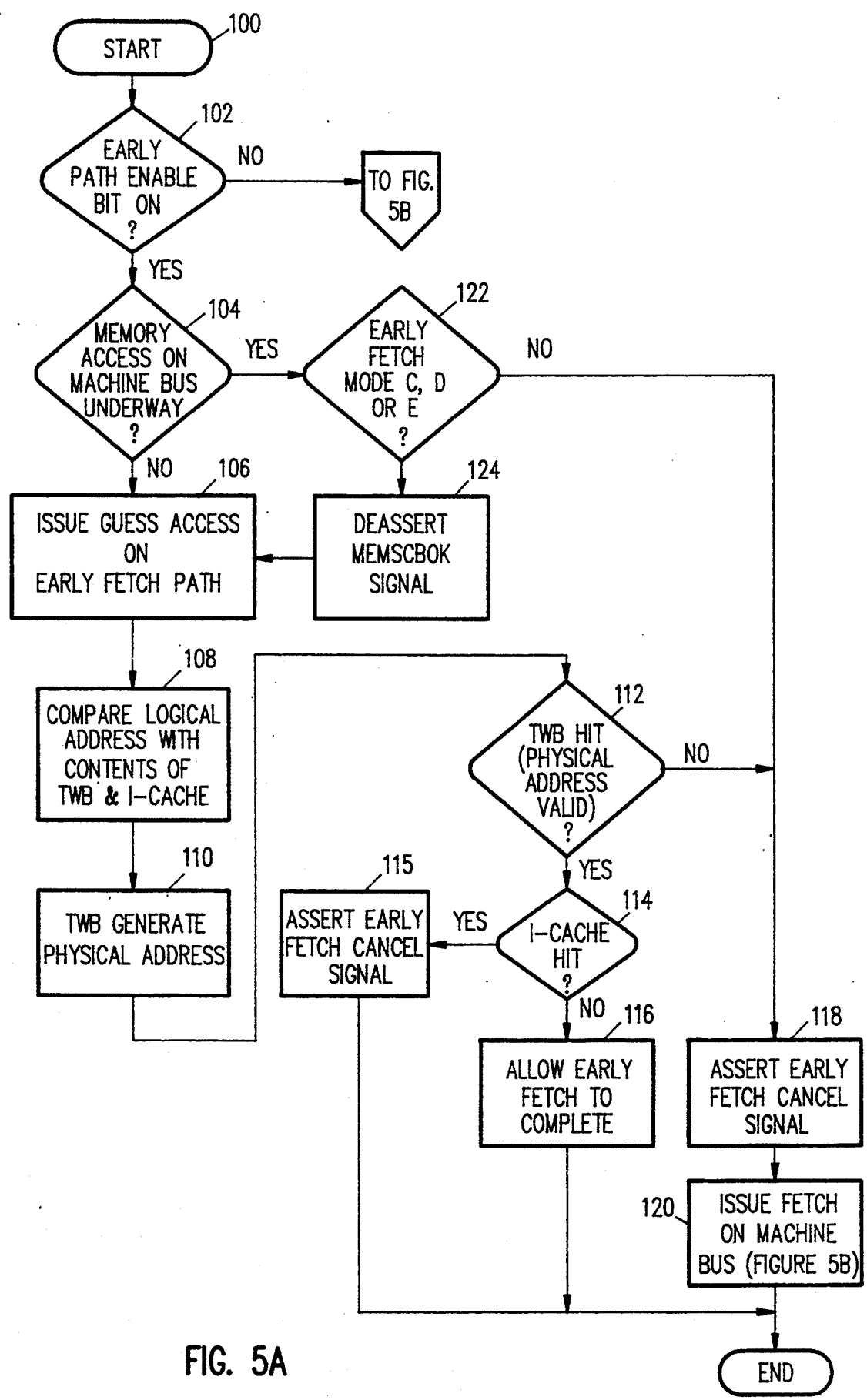
FIGS. 5A and 5B comprise a flow diagram of the operation of the early fetch logic shown in FIG. 2.

Refer to FIG. 5A. The "early fetch" path goes directly to the bus controller and is activated by the early path enable bit. If the early path enable bit is on (102) then if a memory access is not underway on the machine bus (104), then the early-fetch mechanism issues a guess access on the early fetch path (106) to the external bus controller in parallel with an identical access given to the on-chip I-cache. After checking the TWB for a hit (112) and the on-chip I-cache for a hit (114), this guess access is either allowed (116) or canceled (118) by asserting the early fetch cancel signal. If the on-chip cache has the data, then the external guess access is canceled (115). If the on-chip cache does not have the data, then the external access is allowed to complete (116). If the TWB is not able to translate the logical address into the correct physical address, this early-fetch path is also not used and the external access is canceled (118). The fetch access is then reissued (120) on the "slow" path that goes through the main large TLB.

Figure 5B:
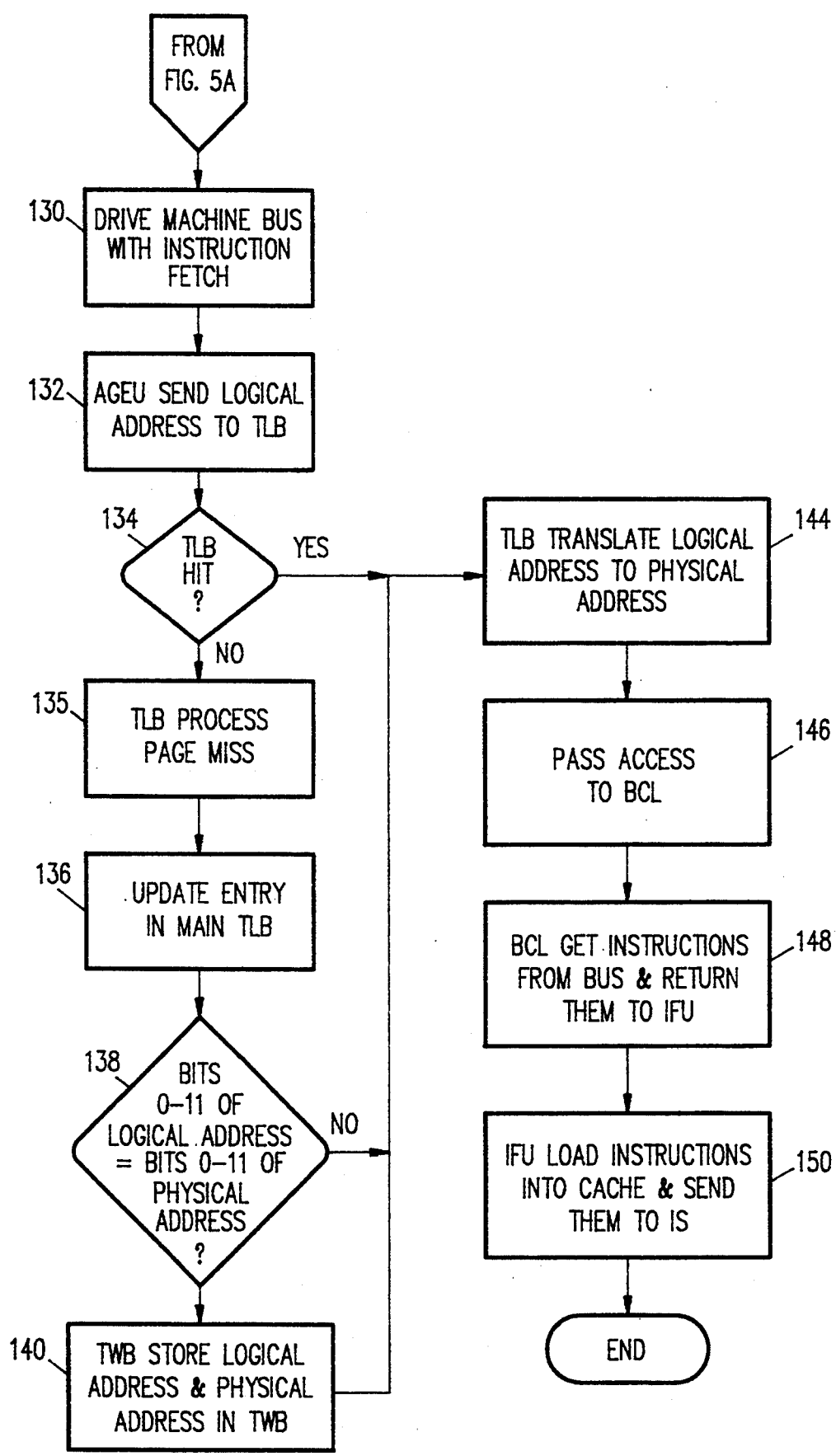

If the early path enable bit is not on (102) then a memory access is initiated on the machine bus as shown in FIG. 5B. Refer to FIG. 5B. The machine bus is driven with an opcode that signifies an instruction fetch (130). Next (132), the AGEU sends a logical address to the TLB.

If there is a hit in the TLB (134), the TLB translates the logical address to a physical address (144) and passes the access to the BCL (146).

If there is a miss in the TLB (134), the TLB processes the page miss (135) and updates the entry in the TLB (136).

The bits 0-11 of the logical address are compared (138) with the bits 0-11 of the physical address. If equal, the TWB stores (140) the logical and physical addresses in the TWB.

After the TLB translates the logical address to a physical address (144) and passes the access to the BCL (146), the BCL gets the instructions from the bus and returns them to the IFU (148). Next (150) the IFU puts the instructions in the cache and sends them to the IS.

Successful Early-fetch Transaction

Refer to FIGS. 3 and 5A. The early-fetch strobe is generated by the IFU, in anticipation of a logical address. The BCL arbitration takes place at the same time as the early-fetch strobe is asserted. If this arbitration fails, the early fetch effectively did not happen. The logical address is given to the IFU one cycle later. The TWB generates a physical address (block 110) the same phase as it receives the logical address. The following phase, the cache and the TWB are accessed. If the TWB hits (a yes from decision block 112), meaning the physical address generated by the TWB is valid, and the cache misses (a no from decision block 114), meaning the referenced instructions are needed from external memory, the early fetch is allowed to complete (block 116).

Unsuccessful Early-fetch Transaction

Refer to FIGS. 4 and 5A. The early-fetch strobe is generated by the IFU, in anticipation of a logical address. The BCL arbitration takes place at the same time as the early-fetch strobe is asserted. If this arbitration fails, the early-fetch effectively did not happen. The logical address is given to the IFU one cycle later. The TWB generates a physical address (block 110) the same phase as it receives the logical address. The following phase, the cache and the TWB are accessed. If either the cache hits (a yes from decision block 114), meaning the instructions are already in the cache, or the TWB misses (a no from decision block 112), meaning that the physical address generated by the TWB is invalid, the cancel signal is asserted and the early fetch is canceled (block 118).

While the invention has been particularly shown and described with reference to preferred embodiments thereof, it will be understood by those skilled in the art that the foregoing and other changes in form and detail may be made therein without departing from the scope of the invention.

We claim:

1. In a data processing system, that includes
a bus controller for accessing a main memory;
an instruction fetch unit (IFU) which has therein instruction fetch logic and a translation write buffer (TWB);
a cache having a cache contents for storing instructions at physical addresses and for fetching instructions from said bus controller;
said TWB being a small translator having a TWB contents for mapping at least two logical addresses to physical addresses of said cache;
a method of fetching instructions in response to a logical address in an instruction pointer comprising the steps of:
A. asserting an early fetch line to said bus controller;
B. presenting a logical address from said IFU to said TWB;
C. Checking said logical address with said TWB contents of said TWB for a hit;
D. Checking a physical address translated from said logical address with said cache contents of said cache for a hit; and,
E. asserting a cancel early fetch line to said bus controller upon a second condition that there is either a miss in said TWB or a hit in said cache.

2. The method in accordance with claim 1 wherein said data processing system further includes a main translation lookaside buffer (TLB), said TLB being a large translator for mapping more than two logical addresses to physical addresses of said main memory, said method further comprising the steps of:
F. issuing a fetch access to said TLB upon a third condition that there is a miss in said TWB.

3. In a data processing system, that includes
a bus controller for accessing a main memory;
an instruction fetch unit (IFU) which has therein a translation write buffer (TWB);
a cache connected to said TWB and to said bus controller for storing instructions at physical addresses and for receiving instructions fetched by said bus controller;
said TWB being a small translator having a TWB contents for mapping at least two logical addresses to physical addresses of said cache;
an apparatus for fetching instructions in response to a logical address in an instruction pointer comprising:
control logic means connected to said TWB and to said bus controller;
said control logic including an early fetch line connected to said bus controller;
said control logic including means for asserting said early fetch line;
said control logic including means for presenting a logical address to said TWB;
said control logic including a cancel early fetch line connected to said bus controller;
said TWB including TWB comparing means for checking said logical address with said TWB contents of said TWB for a hit;
said cache including cache comparing means connected to said control logic means for comparing said physical address with said cache contents of said cache for a hit;
said control logic means including canceling means for asserting said cancel early fetch line upon a condition that there is either a miss in said TWB or a hit in said cache;
said bus controller including means responsive to said cancel early fetch line for canceling said access to said main memory.

4. The apparatus in accordance with claim 1 wherein said control logic means further includes issue fetch means for reissuing said guess fetch access.

5. In a data processing system, that includes a main memory, a combination comprising:
a bus controller for initiating an access to said main memory;
an instruction fetch unit (IFU);
said IFU including a translation write buffer (TWB);
a cache connected to said TWB and to said bus controller;
said cache including means for receiving instructions fetched by said bus controller;
said cache including means for storing said instructions at physical addresses;
said TWB being a small translator having a TWB contents for mapping at least two logical addresses to physical addresses of said cache;
control logic connected to said TWB and to said bus controller;
said control logic including an early fetch line connected to said bus controller;
said control logic including means for asserting said early fetch line;
said control logic including means for presenting a logical address;
said control logic including a cancel early fetch line connected to said bus controller;
said TWB including TWB comparing means for checking said logical address with said TWB contents of said TWB for a hit;
said cache including cache comparing means connected to said control logic means for comparing said logical address with said cache contents of said cache for a hit;
said control logic including canceling means for asserting said cancel early fetch line upon a condition that there is either a miss in said TWB or a hit in said cache;
said bus controller including means responsive to said cancel early fetch line for canceling said access to said main memory.

* * * * *